UNITED STATES PATENT OFFICE.

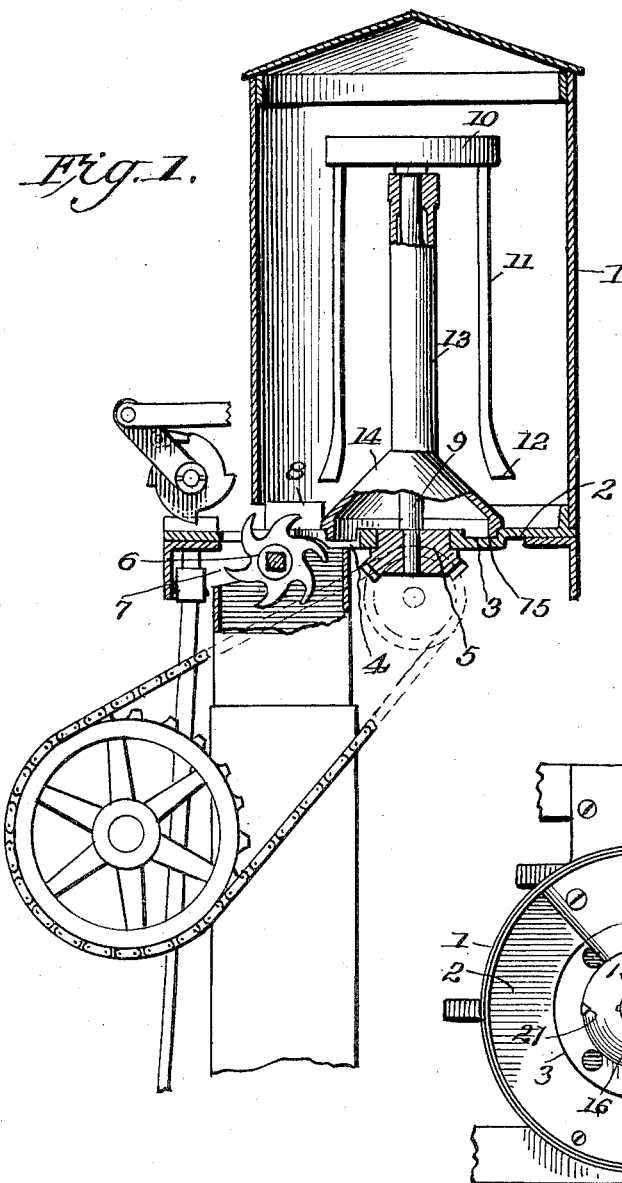

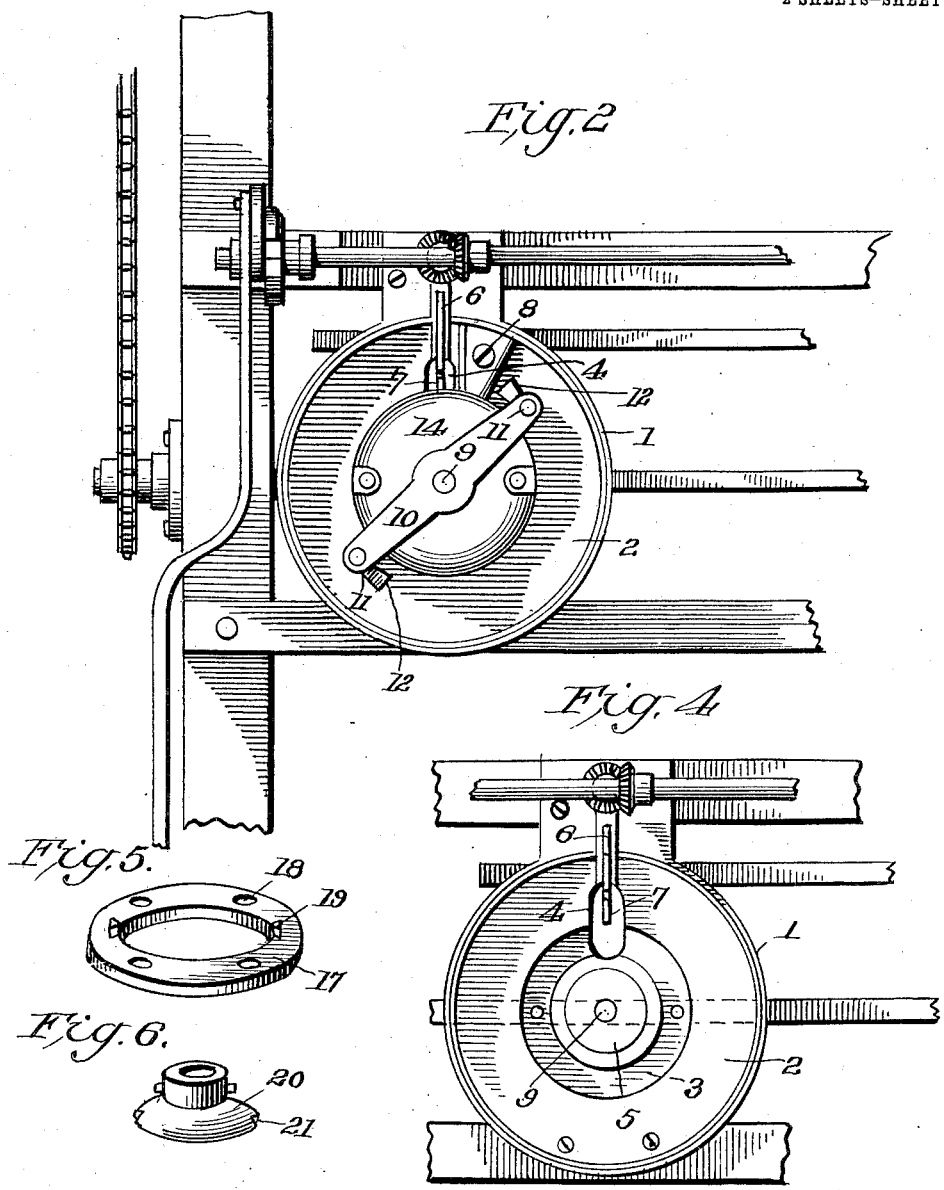

WILLIAM G. JOHNSON, OF KINGFISHER, OKLAHOMA.

CONVERTIBLE SEEDBOX.

1,067,174.  Specification of Letters Patent.  Patented July 8, 1913.

Application filed August 23, 1912. Serial No. 716,762.

*To all whom it may concern:*

Be it known that I, WILLIAM G. JOHNSON, a citizen of the United States, residing at Kingfisher, in the county of Kingfisher and State of Oklahoma, have invented certain new and useful Improvements in Convertible Seedboxes, of which the following is a specification.

This invention has relation to convertible seed boxes adapted to be used upon planters and having its parts so arranged that it may be used for planting smooth seed, as for instance corn, or may be converted into a box adapted to be used for selecting lint bearing seed, as for instance cotton seed.

In the accompanying drawings: Figure 1 is a vertical sectional view of the seed box showing the parts arranged for planting cotton seed; Fig. 2 is a top plan view of the same; Fig. 3 is a top plan view of the seed box, showing the parts arranged for planting smooth seed; Fig. 4 is a top plan view of the seed box with the seed actuating devices removed; Fig. 5 is a perspective view of a ring used in the box when smooth seed are planted; Fig. 6 is a perspective view of a disk used in the box when smooth seed are planted.

Corresponding and like parts are referred to in the following description and indicated in all the views of the accompanying drawings by the same reference characters.

The box 1 is provided with a bottom 2 which in turn is provided at its upper side with a concentrically positioned annular groove 3. The bottom 2 is further provided with an opening 4 which extends into the groove 3. A gear wheel 5 is journaled for rotation in the center of the bottom 2 and any suitable means may be provided for rotating the said wheel.

A feeder 6 is journaled for rotation at a point below the bottom 2 and any suitable means may be provided for rotating the feeder. This feeder is provided with a series of peripheral fingers 7 which pass through the opening 4 as the feeder rotates and which enter the lower portion of the box 1. The fingers 7 are of such length that as they move about the axis of the feeder they do not enter that portion of the opening 4 which lies in the groove 3. This feeder is designed to operate upon lint bearing seed, as for instance cotton seed, or seed of a similar character, but does not operate upon corn or smooth seed.

Presuming that the parts are arranged for planting cotton or lint bearing seed, an abutment 8 is fixed to the bottom 2 at or beyond one edge of the opening 4. A relatively long shaft 9 is mounted upon the wheel 5 and extends up in the box 1. A head 10 is mounted at the upper end of the shaft 9 and downwardly disposed arms 11 are fixed to the ends of the head 10 and are located at equal distances from the shaft 9. The lower ends 12 of the arms 11 are flattened and are curved rearwardly with relation to the direction in which the arms 11 move about the axis of the shaft 9. A sleeve 13 surrounds the shaft 9 and is provided at its lower end with a cone shaped extension 14 which rests at its edge upon the bottom 2 beyond the outer edge of the groove 3. The extension 14 is provided at its lower end with an annular rib 15 which fits down in the outer portion of the groove 3 and bears against the bottom and the outer edge thereof. It is preferable that the sleeve 13 and the extension 14 remain stationary while the shaft 9 rotates, but if desired the parts may be connected by any appropriate means so that they may rotate in unison.

The operation of the parts when so assembled is as follows: The shaft 9 rotates continuously, as does also the feeder 6, and the seed deposited in the box 1 are engaged by the arms 11 and the flattened ends 12 thereof and are agitated and moved in the box. As the seed comes in contact with the feeder 6 it is engaged by the fingers thereof and drawn down through the opening 4 from which it is permitted to fall to the ground. The abutment 8 prevents the arms 11 from sweeping the seed past the feeder as the seed will encounter the said abutment and will be engaged by the fingers of the feeder and drawn out of the box as indicated. When the box is used for planting corn or smooth seed the long shaft 9, the sleeve 13 and the abutment 8 are removed and a stub shaft 16 is mounted upon the center of the wheel 5. A ring 17 is placed in the groove 3. This ring fits snugly in the groove and its upper surface is in alinement with the upper surface of the bottom 2. The ring 17 is provided at intervals with openings 18 and at its opposite sides and upon its upper surface with nibs 19. A disk 20 is fixed to the shaft 16 and is provided at its edge with notches 21 which receive the nibs 19. A plate 22 is attached to the bottom 2 and has an edge portion that extends over the adjacent part of the ring 17 and the inner edge of the plate 22 fits against the adjacent peripheral portion of the disk 20. The plate 22 is provided at a point between its ends with an elevated portion 23 which is located directly above the feeder 6 and which houses the end portions of the fingers 7 when they enter the box 1. Therefore as the shaft 16 rotates with the wheel 5 the disk 20 carries the ring 17 around in the groove 3. When the openings 18 are from under the plate 22 they will receive groups of seed and these groups are carried around and under the plate 22 and when each opening 18 arrives over the opening 4 the group of seed falls from the opening in the ring 17 through the opening 4 to the ground or to suitable dropping devices with which the planter upon which the box is mounted may be equipped. As each opening 18 passes under the plate 22 the edge of the said plate holds back the superfluous seed in the box so that only the group of seed which is contained within the opening is permitted to pass under the plate and fall through the opening 4 in the bottom 2. Therefore it will be seen that a simple seed box is provided and that the same may be readily converted from a box adapted to operate upon lint bearing seed to one which may operate upon smooth seed and vice versa.

While the foregoing description and accompanying drawings set forth the preferred embodiment of my invention, it is to be understood that various changes may be made in the details of construction and arrangement and proportions of the parts without departing from the scope of the invention as defined by the appended claims.

Having thus described the invention, what is claimed as new is:

1. A seed box having a bottom provided with an annular groove and an opening entering the groove, a feeder journaled for rotation and entering the opening but terminating short of that part of the opening which is located in the groove, a shaft journaled in the bottom concentric with the groove, means for moving the seed connected with the shaft, and a conical deflector extending over the groove.

2. A seed box having a bottom provided with an annular groove and an opening which extends into the groove, a feeder journaled for rotation and extending through the opening but terminating short of that part of the opening which extends into the groove, a wheel journaled in the bottom concentric with the groove, means for moving the seed connected with the wheel, and means for directing the seed into the opening.

3. A seed box having a bottom provided with an annular groove and having an opening which extends into the groove, a feeder journaled for rotation and extending into the opening but terminating short of that part of the opening which extends into the groove, a wheel journaled for rotation in the bottom of the box and concentrically positioned with relation to the groove, a shaft carried by the wheel, seed moving mechanism carried by the shaft, and a sleeve surrounding the shaft and having a conical extension which bears at its edge upon the bottom beyond the outer edge of the groove, said extension having a rib which enters the groove and fits against the outer edge thereof.

4. A seed box having a bottom provided with an annular groove and having an opening which extends into the groove, an abutment mounted upon the bottom at the edge of the opening, a feeder journaled for rotation and extending through the opening but terminating short of that part of the opening which extends into the groove, a wheel journaled in the bottom concentric with the groove, means for moving the seed connected with the wheel, and means for directing the seed located in the groove.

5. A seed box having a bottom provided with an annular groove and having an opening which enters the groove, a feeder journaled for rotation and extending through the opening but terminating short of that part of the opening which enters the groove, a wheel journaled for rotation in the bottom and concentrically positioned with relation to the groove, a shaft carried by the wheel, a head mounted upon the shaft, arms attached to the head and having flattened curved lower ends, a sleeve surrounding the shaft and having a conical extension which bears at its edge upon the bottom beyond the outer edge of the groove, said extension having a rib which fits against the outer edge of the groove.

In testimony whereof I affix my signature in presence of two witnesses.

WILLIAM G. JOHNSON. [L. S.]

Witnesses:
   A. E. STALNAKER,
   D. K. CUNNINGHAM.

---

Copies of this patent may be obtained for five cents each, by addressing the "Commissioner of Patents, Washington, D. C."